Dec. 13, 1955  F. DODGSON  2,726,565
PROFILE TURNING LATHES
Filed April 13, 1950  4 Sheets—Sheet 2
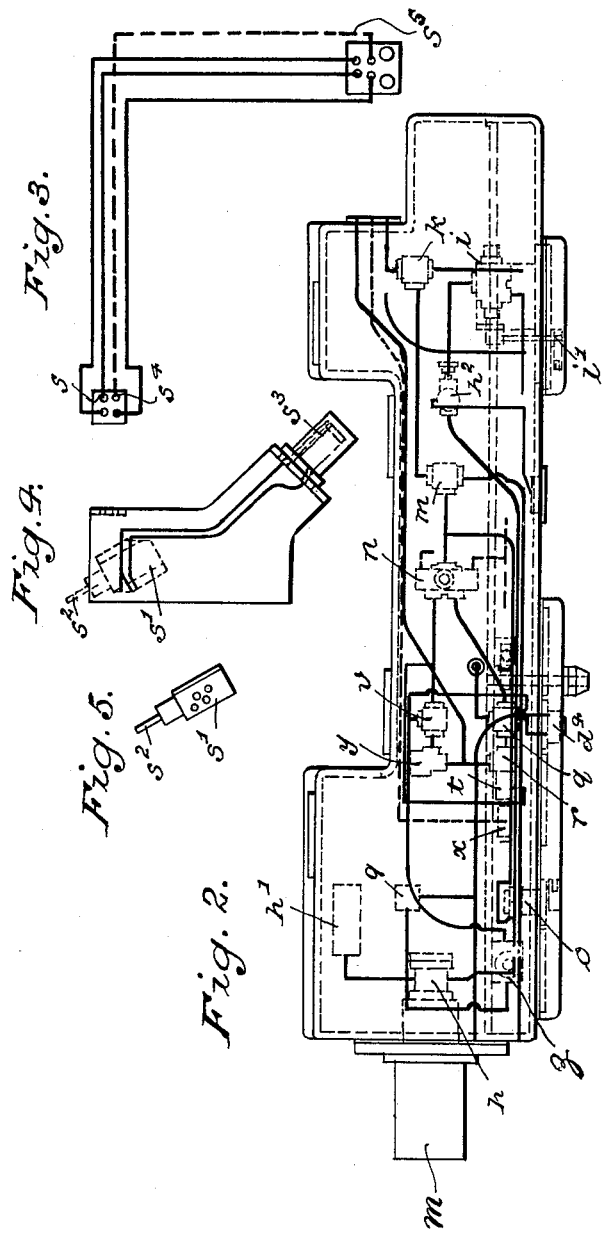
Inventor
Frank Dodgson
By

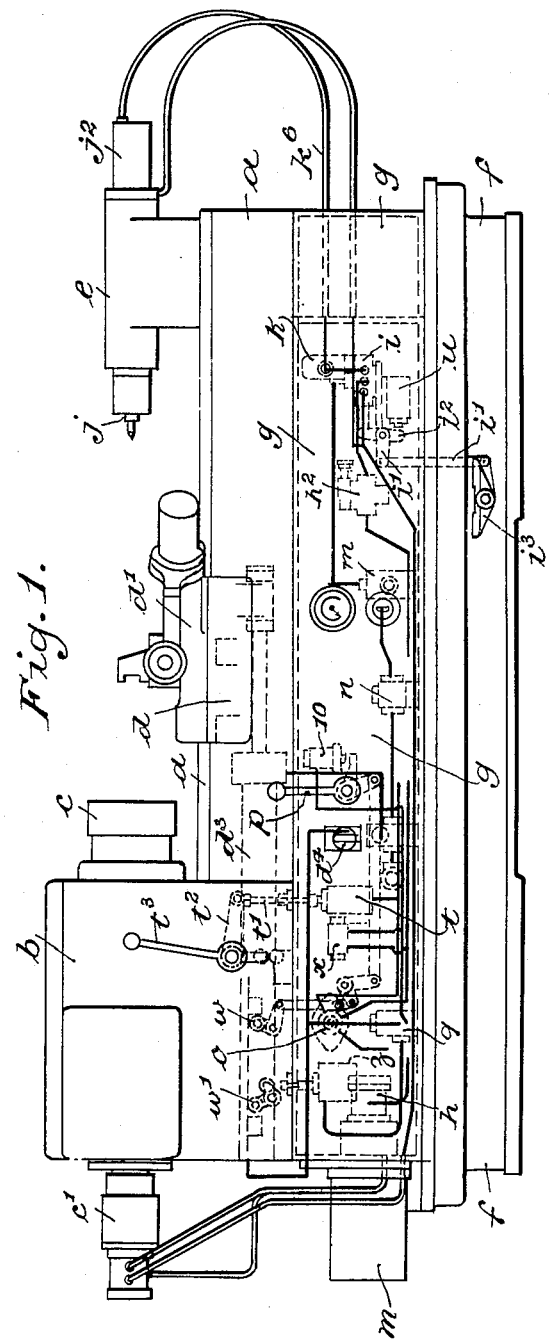

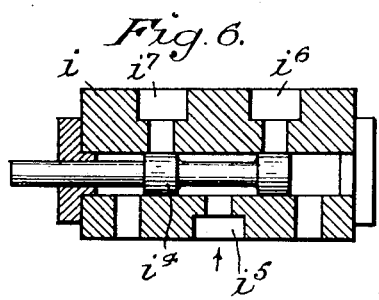
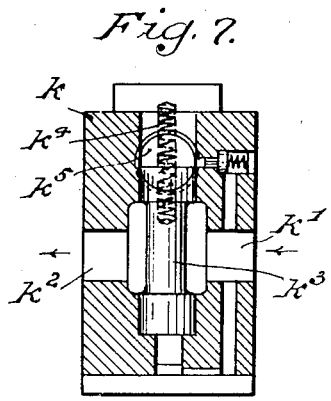
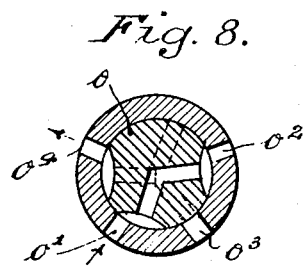
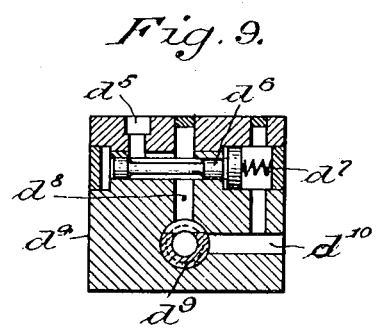
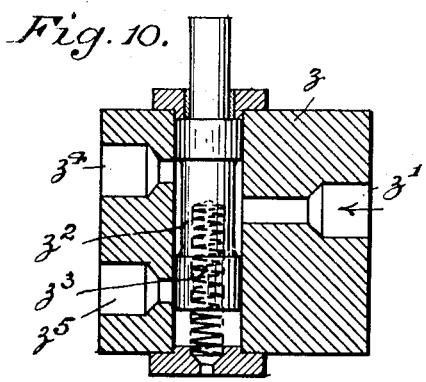
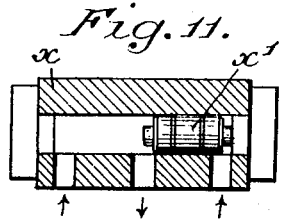

Dec. 13, 1955  F. DODGSON  2,726,565
PROFILE TURNING LATHES
Filed April 13, 1950  4 Sheets-Sheet 4
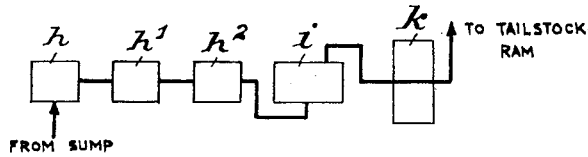
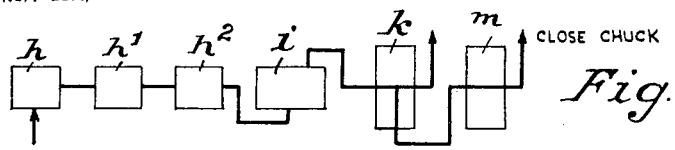
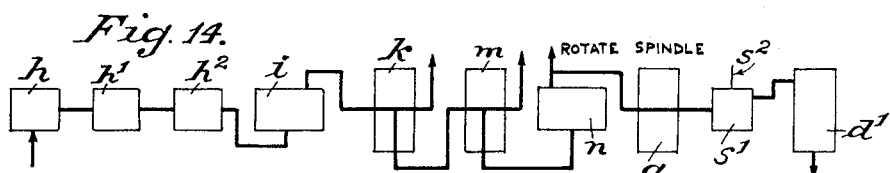
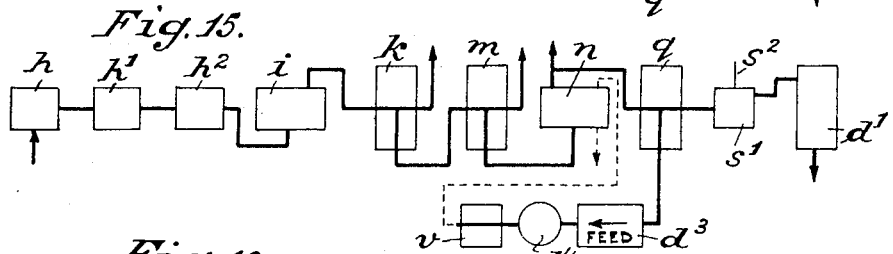
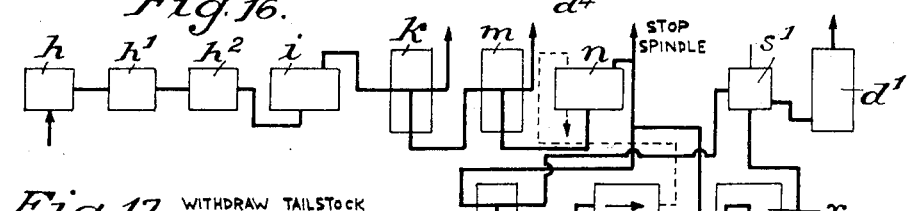
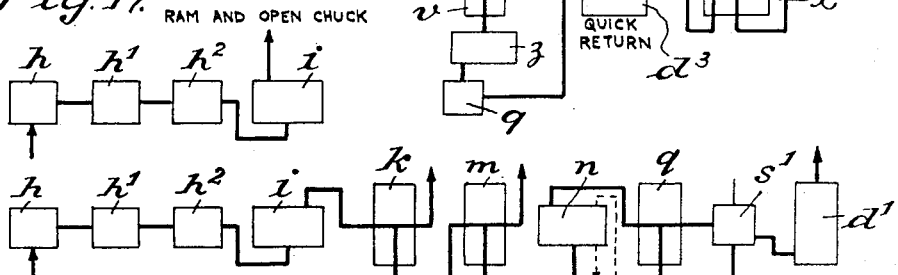
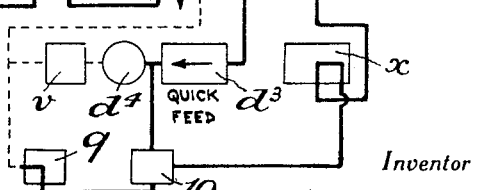
Inventor
Frank Dodgson
By
Michael S. Striker
agt.

United States Patent Office 2,726,565
Patented Dec. 13, 1955

2,726,565

PROFILE TURNING LATHES

Frank Dodgson, Halifax, England, assignor to Churchill-Redman, Limited, Halifax, England Application April 13, 1950, Serial No. 155,589

Claims priority, application Great Britain February 22, 1950

5 Claims. (Cl. 82—14)

The invention has reference to profile turning lathes or tracing lathes as they are sometimes termed, for reproducing on a workpiece the contours of a template or of a finished workpiece, and the invention has for its principal object to provide a lathe of this description in which all the necessary motions are operated by a hydraulic system supplied by a single hydraulic unit.

A further object is to construct a lathe embodying the principal object mentioned, in which the hydraulic unit and the elements by which the pressure liquid is distributed to the various motions constituting the machine, are housed in a common chamber constituting a downward extension of the lathe bed, the lower part of which chamber constitutes a sump or reservoir from which the hydraulic unit draws its supply and to which the oil is returned after having caused the several elements constituting the hydraulic system to perform their allotted functions.

The invention will be described with reference to the accompanying drawings, in which:

Fig. 1 is a side elevation of a lathe embodying a hydraulic system according to the invention;

Fig. 2 is a plan view of the lower part of the lathe, showing the hydraulic unit and some of the valves and other means not shown in Fig. 1, whereby the various motions, forming part of the hydraulic system, and requisite to the functioning of the lathe are operated;

Figs. 3, 4 and 5 are details showing, diagrammatically, the hydraulic connections between the tracing head of the lathe and the hydraulic unit;

Figs. 6 to 11 are sectional views showing the construction of the several valves employed in the hydraulic system; and Figs. 12 to 18 are diagrams illustrating the operation of the system at different points in a work cycle.

Referring to the drawings, $a$ represents a lathe bed having mounted upon it a fixed head-stock $b$ containing appropriate gearing for rotating a chuck indicated at $c$; a tool carriage indicated at $d$ and having mounted upon it a tool slide $d'$; and a tailstock indicated at $e$.

Between the underside of the bed $a$ and a suitable base $f$ there is located a hollow casing $g$ in which is housed a suitable rotary pump $n$, driven by an electric motor $m$. The lower part of the casing $g$ constitutes an oil sump from which the pump $h$ draws oil and delivers it under pressure to the various instrumentalities employed in carrying out the invention and hereafter to be described.

The pump $h$ is arranged to draw oil from the sump, constituted in the lower part of the casing $g$, through a filter $h'$ and to deliver it to a relief valve $h^2$ which is set to determine the maximum pressure at which the hydraulic system of the lathe is to operate.

At $i$ there is represented a distributor valve controlled, through connections $i'$ and one arm of a centrally-pivoted lever $i^2$, from a centrally-pivoted foot pedal $i^3$. This valve $i$ determines whether a tailstock ram $j$ advances and the chuck $c$ closes, or whether the chuck opens and the tailstock ram recedes.

The construction of the valve $i$ is shown in Fig. 6. If the foot pedal $i^3$ is depressed on the left hand side a piston member $i^4$ is, through the connection $i^1$ and lever $i^2$, moved towards the right and pressure oil admitted from the valve $h^2$ through port $i^5$ is permitted to pass, through port $i^6$, to what is termed a first sequence valve $k$, the construction of which is shown in Fig. 7. This valve is, as will be seen, of three-port type and is adapted to allow pressure oil entering at $k'$ to pass straight through and out of port $k^2$ until a predetermined pressure has been built up in the hydraulic circuit whereupon a piston $k^3$ rises, against the pressure of a spring $k^4$ and permits oil to pass to a port $k^5$, termed a forwarding port. The port $k^2$ is connected by a flexible tube $k^6$ to a cylinder $j$ in which the tailstock ram works. The pressure oil entering behind the ram $j$ moves it forward. When the ram meets resistance by coming into contact with a workpiece inserted between it and the chuck $c$ and its further forward movement is arrested, pressure builds up in the circuit and port $k^5$ of valve $k$ opens. This opening of port $k^5$ permits oil to pass to a second sequence valve $m$ of similar construction to the valve $k$. The oil passes straight through the valve $m$ to an operating cylinder $c'$ for the chuck $c$ and causes the chuck to close upon the workpiece. When the chuck jaws meet with resistance from the workpiece, pressure builds up in the valve $m$, and its third or forwarding port (corresponding to the port $k^5$ of valve $k$) opens and permits oil to pass to a valve $n$ corresponding in construction to the valve $i$.

According to the setting of the valve $n$ the pressure oil arriving at the valve is made available either to feed the tool carriage $d$ at a predetermined speed in the cutting direction or to return it quickly to starting position.

Setting of the valve $n$ is controlled by the position of a lever $p$, which determines the position of a pilot valve $o$, the construction of which is shown in Fig. 8. The valve draws oil through a port $o'$ from the main pressure supply from the pump $h$ and, according to its position, determined by the lever $p$ directs the oil either through a port $o^2$ or through a port $o^3$. A port $o^4$ leads back to the sump in the casing $g$. The construction of the valve is such, as will be seen, that when the port $o^2$ is open to pressure supply the port $o^3$ is connected to the exhaust $o^4$, and when port $o^3$ is open to the pressure supply the port $o^2$ is connected to the exhaust.

When the control lever $p$ is in the central vertical position, shown in Fig. 1, the port $o^2$ of valve $o$ is open and pressure oil is passed to valve $n$ to set it in the position in which pressure oil arriving from valve $m$ is passed, by way of a port corresponding to port $i^7$ of valve $i$, to a third sequence valve $q$. The oil passes straight through the valve $q$ and through a non-return valve $r$ to a servo valve $s'$. This valve is spring loaded so that a tracer finger $s^2$ adapted to traverse the surface of a template or copy workpiece is normally moved into a forward position in which it directs oil into a tool cylinder $s^3$ to feed to depth the tool slide $d'$. As soon as the tracer finger contacts the surface of the template or copy and is thereby pressed inwardly, movement of the tool slide towards the workpiece stops and pressure builds up in the hydraulic system. Simultaneously with passage of oil from the port $o^2$ of valve $o$ to position the valve $n$ as above described, oil also passes from said port to a cylinder $t$ a piston in which is connected by a rod $t'$ to an arm $t^2$ associated with a starting lever $t^3$. This automatically causes the main headstock spindle carrying the chuck $c$ to be rotated at the selected speed.

In addition to oil being passed to the cylinder $t$ it is also passed to an interlock cylinder $u$, a piston in which is connected to the lever $i^2$ of the means controlling the valve $i$, thus preventing accidental depression of the foot pedal $i^3$ to the right or chuck opening position.

The building up of pressure in the hydraulic system due to arrest of movement of the tool slide towards the workpiece causes the third or forwarding port of valve $q$ to open and to direct oil to the right hand end of the main feed cylinder $d^3$ for the carriage $d$, thus moving the said carriage in a cutting direction, that is to say towards the left in Fig. 1. This causes oil to be forced out of the left hand end of the cylinder through a flow control device $d^4$ from which it passes to the sump straight through a fourth sequence valve $v$ corresponding to valve $k$, and through valve $n$. The control device $d^4$ is adjusted to allow a greater or less rate of flow out of the cylinder $d^3$ and thus to control the rate of feed movement of the tool carriage $d$. The construction of the flow control device is shown in Fig. 9. Pressure oil is admitted from the feed cylinder through port $d^5$ and acts on a piston $d^6$ behind which is a compression spring $d^7$. The pressure oil passes by way of a passage $d^8$ to a rotary control valve $d^9$ and thence through an outlet port $d^{10}$ to the valve $v$, and thence to the sump. The valve $d^9$ regulates the rate at which oil is permitted to pass out of the feed cylinder and the spring-pressed piston $d^6$ functions to regulate the area of port $d^5$ in accordance with the adjustment of the valve $d^9$. The device $d^4$ may be termed a "metering-out" arrangement, in that there is oil pressure on both sides of the piston in the tool carriage feed cylinder, thereby causing it to be locked in both directions and preventing uneven and jerky movements due to varying pressures on the tool. The tool carriage moves forward at the predetermined rate and during its travel over-deflection of the servo valve $s'$ causes the tool slide to move backwardly and under deflection causes it to move forwardly thus reproducing on the workpiece the form of the template or copy.

When the tool carriage arrives at the end of its movement in the cutting direction it engages an adjustable dog $w$. This causes the control lever $p$ to be moved towards the right, corresponding to the "quick-return" position for the tool carriage. The effect of this movement of the lever $p$ is to move the rotary pilot valve $o$ to cause oil to be directed through port $o^3$. This causes the valve $n$ to be moved to the position in which pressure oil is directed, through a port in said valve corresponding to the port $i^6$ of valve $i$, to the left hand end of the feed cylinder $d^3$. The movement of the valve $n$ just referred to causes oil to be directed to what is termed a tool relief valve $x$ (see Fig. 11). From this valve oil is directed through a flexible pipe $s^5$ to a "tool relief" port $s^4$ on the servo valve $s'$. This causes the tracer finger $s^2$ to be moved backwardly away from the template or copy and thereby admits oil to the tool slide cylinder $d^3$ to move the tool slide backwardly away from the workpiece.

When the tool slide reaches the end of its backward travel away from the workpiece, pressure builds up in the system. This pressure first acts on the piston in cylinder $t$ to effect stoppage of rotation of the work spindle and then opens the third port of the sequence valve $v$, corresponding to the port $k^5$ of valve $k$. Oil then travels through ports $z'$ and $z^4$ of a valve $z$ (see Fig. 10), to a non-return valve 9 from which it passes to the left hand end of the feed cylinder $d^3$. The right hand end of the cylinder has an unrestricted outlet (through valves $q$ and $n$ to the sump) so that the tool carriage $d$ moves in quick motion to the tailstock end of the machine. At the end of its return movement the carriage engages an adjustable dog $w'$ which causes valve $z$ to be changed over to deflect the oil through port $z^5$ back to the tank, and thus to stop the movement of the carriage.

If the foot pedal $i^3$ is now depressed on the right hand side, oil is delivered through port $i^7$ of valve $i$, and is directed to the cylinder of the tailstock ram $j$ to withdraw the ram, and also to the chucking cylinder $c'$ to cause the chuck $c$ to be opened. On relieving the foot pressure on pedal $i^3$ the pedal is returned to its central position by the action of a spring, not shown, in which position the pump $h$ unloads freely to the sump.

The various elements employed in the hydraulic system having been described, a clearer understanding of the operation of the system will be had from the diagrams shown in Figs. 12–18.

Fig. 12 illustrates the first step of operating the tailstock ram $j$ to press a workpiece into the chuck $c$. The pump $h$ having been started up it delivers oil through filter $h'$ and pressure relief valve $h^2$ to the distributing valve $i'$ which, by depression of the foot pedal $i^3$ on the left hand side having been positioned to cause oil to be delivered to the first sequence valve $k$ through which it passes, without obstruction, to the co-operating cylinder of the tailstock ram.

Fig. 13 illustrates the next step, namely, the closing of the chuck on the workpiece. The arrest of movement of the tailstock ram towards the chuck has caused pressure to build up in the system with the result that the forwarding part $k^5$ of valve $k$ has opened and delivered oil straight through the second sequence valve $m$ to the chucking cylinder $c'$ to close the chuck jaws.

The next step, illustrated in Fig. 14, is the bringing into action of the tracer finger $s^2$ and thereby of the tool slide $d'$. Arrest of movement of the chuck jaws by closing on the workpiece has caused pressure to build up again in the system, with the result that the forwarding port of the second sequence valve $m$ has opened and has passed oil to distributing valve $n$. This valve having been approximately set by lever $p$ and pilot valve $o$ the oil has passed to and straight through the third sequence valve $q$ to the servo valve $s'$, the action of which has caused the tool slide to be moved towards the workpiece. As has already been described the movement of pilot valve $o$ to set the valve $n$ in position to pass oil to valve $g$ has also passed oil to the means for rotating the chuck $c$ and to the interlock valve $u$.

Fig. 15 illustrates the next step, namely, the bringing into action of the tool carriage feed in a cutting direction. Arrest of movement of the tool slide towards the workpiece by contact of the tool with the work has caused pressure to build up in valve $q$. This has caused the forwarding port of said valve to open and to pass oil to the right hand end of the feed cylinder $d^3$, causing the tool carriage $d$ to move in the cutting direction, that is to say, towards the left in Fig. 1, the rate of such movement being determined by the feed control device $d^4$.

The next step namely the quick return of the tool carriage towards the tailstock end of the machine is illustrated in Fig. 16. Arrival of the tool carriage at the end of the cutting stroke has caused the control lever $p$ to be moved over towards the right from the central position shown in Fig. 1. This has caused valve $o$ to be rotated to change over the supply of oil from the right hand to the left hand end of the feed cylinder $d^3$ so that the tool carriage $d$ moves towards the right in Fig. 1. As this movement is not restricted, as has been previously described, the return movement is made in quick motion, the tool slide having withdrawn the tool from the work as also has been described.

Fig. 17 illustrates the completion of the work cycle. The tool carriage having arrived at the end of its return movement and its movement having been stopped, the foot pedal $i^3$ has been depressed on its right hand side. This has opened up port $i^7$ of valve $i$ and caused oil to be delivered to withdraw the tailstock ram $j$ and to open the jaws of chuck $c$ to permit of removal of the finished workpiece.

It may be required to move the tool carriage quickly towards the headstock $b$ instead of it being moved slowly under control of the device $d^4$. To enable this to be done the control lever $p$ is moved towards the left in Fig. 1.

This operates as valve 10 (without affecting the delivery of oil to valve $q$) and admits oil to valve $k$, causing the servo valve $s'$ to be moved to a position in which the tracer finger is withdrawn from the template and the oil from valve $q$ caused to act on the piston in the tool slide cylinder to move the tool slide $d'$ away from the work. This stops for the time being the supply of pressure through the third or forwarding port of valve $q$, but as soon as the tool slide has completed its withdrawal and its backward motion is arrested, pressure builds up again in valve $q$ and reopens its forwarding port to resume feed of the tool carriage towards the headstock. Simultaneously with admitting pressure oil to valve $x$ the operation of valve 10 causes oil to pass to a piston in the base of the non-return valve $q$ thus allowing the said valve to have free flow in both directions. Instead, therefore, of oil expelled from the feed cylinder $d^3$ having to force its way through the central device $d^4$ it has a free outlet to the sump through valves 10, 9 and $n$, thus allowing the tool carriage to travel towards the headstock at its maximum speed. The operation just described is illustrated diagrammatically in Fig. 18.

It will be apparent that the location or disposition of the various valves and other parts constituting the hydraulic system may be varied from the particular embodiment illustrated.

Having thus described my invention, what I claim as new and desire to secure by Letters Patent is:

1. A profiling turning lathe comprising a tailstock, a fluid operated ram for said tailstock, a headstock spindle having a fluid operated chuck, a fluid operated toolslide mounted on a fluid operated tool carriage, a template, a tracer finger, and a hydraulic system for controlling the operation of said profiling turning lathe comprising; a driven pump; a relief valve governing the pressure at which fluid is delivered by said pump; a first distributing valve to which fluid is delivered by the relief valve; operating means for said first distributing valve; a first sequence valve having an inlet port connected to said distributing valve and an outlet port connected to said tailstock ram so that upon operation of said first distributing valve fluid is permitted to flow for moving said tailstock ram; a forwarding port in said first sequence valve adapted to be opened at the sequence valve is operated by the building up of fluid pressure in the system due to the arrest of movement of said tailstock ram when pressing a workpiece towards said chuck; a second sequence valve having an inlet port connected to the forwarding port in said first sequence valve and an outlet port connected to said fluid operated chuck for closing said chuck upon operation of said first sequence valve; a forwarding port in said second sequence valve adapted to be opened as the second sequence valve is operated by the building up of pressure in the system due to the arrest of movement of the closed chuck; a second distributing valve connected to the forwarding port of said second sequence valve; a pilot valve in said last mentioned connection; manual means for operating said pilot valve to control the supply of fluid to said second distributing valve; a spring loaded servo-valve mounted on said tool-slide for controlling the motion thereof; a third sequence valve including a non-return valve and having an inlet port connected to said second distributing valve and an outlet port connected to said spring loaded servo-valve; said tracer finger carried by and operating said spring loaded servo-valve; a forwarding port in said third sequence valve for delivering fluid to effect movement of said tool carriage in a longitudinal direction upon operation of said third sequence valve by the building up of a predetermined pressure upon the arrest of said tracer finger by said template following movement of the tool slide under the action of said servo valve; and means operated by said last-mentioned predetermined pressure to cause rotation of said headstock spindle.

2. In a profiling turning lathe as set forth in claim 1; means to prevent accidental opening of the chuck while the headstock is rotating.

3. In a profiling turning lathe as set forth in claim 1; means to control the flow of fluid for moving the tool carriage in said longitudinal direction and thereby determining the rate of feed of said tool carriage.

4. In a profiling turning lathe as set forth in claim 1; means whereby the tool carriage at the end of its movement in longitudinal direction alters the position of the pilot valve for causing movement of the tool carriage in a return direction in rapid traverse; and means whereby during such rapid traverse of said tool carriage the tool is withdrawn from the workpiece and the tracer finger is held clear of the template.

5. In a profiling turning lathe as set forth in claim 1; means to enable the tool carriage to be moved in rapid traverse toward the chuck; and means to withhold the tool from the work piece and to hold the tracer finger clear of the template during such movement of the tool carriage.

References Cited in the file of this patent

UNITED STATES PATENTS

| Number | Name | Date |
| --- | --- | --- |
| 2,301,028 | Esch | Nov. 3, 1942 |
| 2,338,125 | May | Jan. 4, 1944 |
| 2,388,460 | Bagley | Nov. 6, 1945 |
| 2,388,716 | Svenson | Nov. 13, 1945 |
| 2,389,746 | Sparks et al. | Nov. 27, 1945 |
| 2,442,868 | Dare | June 8, 1948 |
| 2,471,097 | Dall et al. | May 24, 1949 |
| 2,499,235 | Tyson | Feb. 28, 1950 |